Oct. 22, 1940.  W. H. DONNELLY ET AL  2,218,907
RADIO NAVIGATION
Filed July 11, 1938   3 Sheets-Sheet 1

INVENTORS
WILLIAM H. DONNELLY,
PAUL J. HOLMES,
BY
ATTORNEYS.

INVENTORS.
WILLIAM H. DONNELLY,
PAUL J. HOLMES,
BY
ATTORNEYS.

Oct. 22, 1940.  W. H. DONNELLY ET AL  2,218,907
RADIO NAVIGATION
Filed July 11, 1938   3 Sheets-Sheet 3
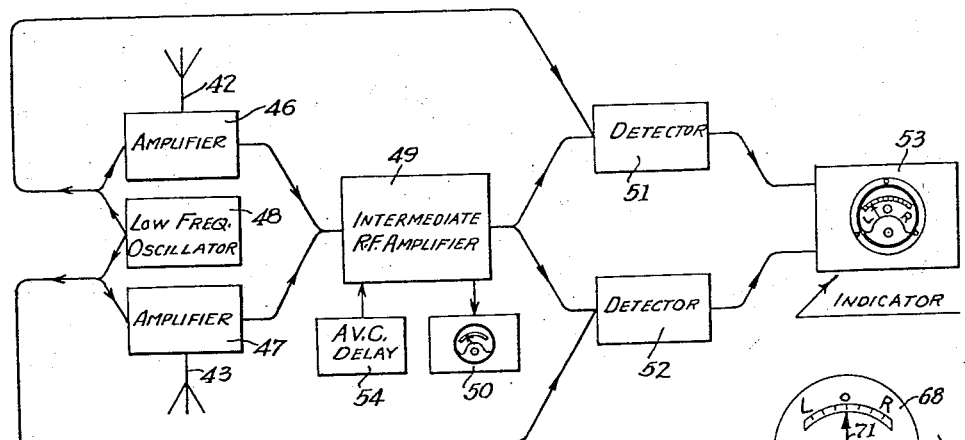
Fig.7.
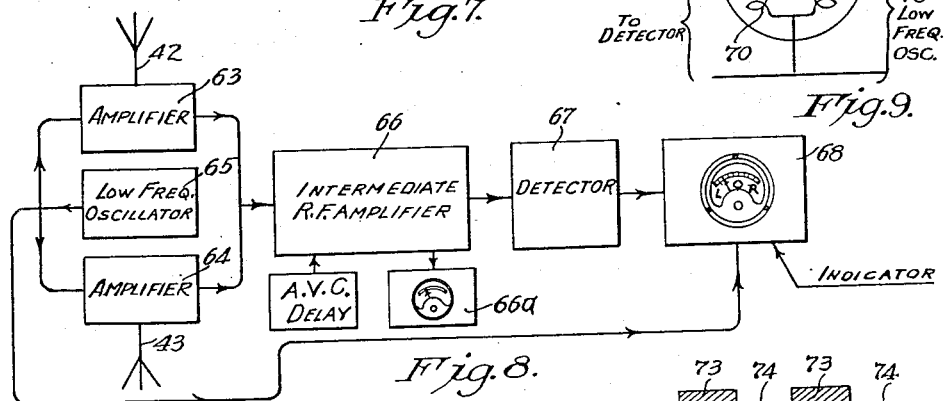
Fig.8.
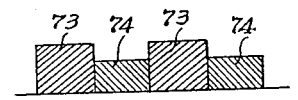
Fig.9.
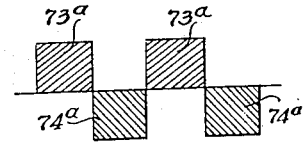
Fig.10.
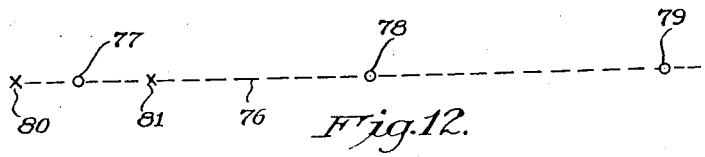
Fig.12.
Fig.11.
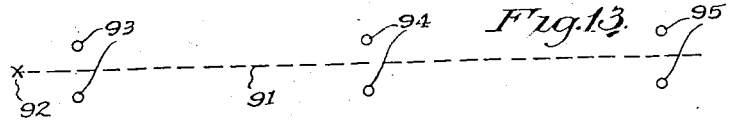
Fig.13.
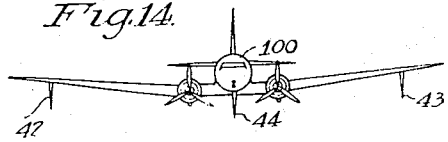
Fig.14.
INVENTORS.
WILLIAM H. DONNELLY
PAUL J. HOLMES.
BY
ATTORNEYS.

UNITED STATES PATENT OFFICE 2,218,907

RADIO NAVIGATION

William H. Donnelly and Paul J. Holmes, Los Angeles, Calif.

Application July 11, 1938, Serial No. 219,702

1 Claim. (Cl. 250—11)

This invention relates in general to radio navigation and pertains more particularly to a method and apparatus for maintaining an airplane or other moving body or object on a course toward an objective or place by guiding the airplane in accordance with perceptible or intelligible indications derived from a radiation receiver carried on the airplane or the like and received from one or more radiating stations located, for example, on land at a fixed position having a known location with respect to the objective, or, as another example, located at or near the objective as on an airplane carrier or near an airport. It is to be understood that the navigation system herein disclosed and claimed is not limited to use with airplanes, but is adapted for use with moving bodies in general, as rockets, torpedoes, vessels at sea, or other moving bodies. However, in order to clearly set forth an illustrative embodiment, our navigation system will be described primarily as employed for guiding airplanes, because it is particularly designed and adapted to this purpose.

Many radio aids to navigation have been proposed and numerous ones are in use. However, they practically all require the use of directional antenna equipment such as a loop antenna. The operation of equipment using a loop antenna is generally complicated and the installation thereof is expensive. Furthermore, the accuracy of the course flown depends upon the setting of the loop antenna which is subject to inherent directional errors and is dependent to a large extent upon the strength of the received signal, a true bearing using a loop antenna being difficult to obtain with a rapidly fluctuating signal or with a weak signal. Some systems depend upon guidance received from relatively narrow beams which are separated by relatively great angular distances; thus, unless the airplane is on one of these beams to begin with considerable flight over unknown and hazardous terrain may be necessary before the plane receives the guidance of the beam.

It is a particular object of this invention to provide a radio navigation aid or homing device which does not require directional equipment such as a rotatable loop antenna.

Another object of the invention is to provide a radio navigation system with which a definite and distinct course toward a place may be maintained by an airplane which is approaching the objective from any direction, the usefulness of the system thus not being necessarily confined to narrow zones of flight as when following the conventional radio beam.

A further object of the invention is to provide a radio navigation system with which a known land course may be maintained toward a given place, irrespective of direction and velocity of the wind. This is of importance since it keeps a plane from flying over unknown and dangerous territory when flying blind; also, the distance flown by a plane is a minimum.

A further object of the invention is to provide a radio navigation system with which true ground speed indications may be obtained.

Another object of our invention, according to one embodiment thereof, is to provide a radio navigation system which will directly indicate course deviations and give the sense or direction thereof.

Another object of the invention is to provide a radio navigation system by means of which perceptible indications are produced by apparatus carried on an airplane which signify the approach or departure of the airplane with respect to a given radio station or stations.

Another object of the invention is to provide a radio navigation system with which the position of an airplane on a course and its distance from a pair of guiding radiators may be determined.

A further object of the invention is to provide a radio navigation method and apparatus with which the true compass bearing of a land course which an airplane is flying may be obtained.

A further object of the invention is to provide a radio navigation method and apparatus with which the off-course heading produced by a side wind may be determined when the plane is flying a given land course.

A further object of the invention is to provide a radio navigation system which may be employed in combination with well known control equipment to provide for automatic piloting of an airplane.

A further object of the invention is to provide a radio navigation system which utilizes relatively simple and inexpensive mobile and stationary equipment.

Another object of the invention is to provide a radio navigation system which is relatively simple in operation.

Further objects and advantages of the invention, of which the above are typical, will become apparent as the description proceeds.

In general, our invention utilizes changes in frequency of one or more wave systems produced by changes in speed and/or course of the airplane to provide the necessary course and true ground speed indications.

The method of this invention includes radiating a system of oscillations of given frequency such as a radio carrier wave from a fixed station having a known location with respect to a known objective to which it is desired to guide a moving body, the station being preferably at or near that place so that the station itself may in some cases form the objective. A second system of oscillations of given frequency is generated at a position either stationary or moving but spaced from the fixed station, and the two systems of oscillations are superimposed to produce a composite system of oscillations. In one case this generated system of oscillations is radiated as a radio carrier wave which is superimposed in space on the first radio carrier to produce a composite system of oscillations in space; and in the other case, the generated oscillations are heterodyned or beat with the oscillations or carrier waves received in a receiver to produce a composite system of oscillations in the receiver. A perceptible signal is then produced from this composite system of oscillations in a radio receiver carried on the body, which signal varies in frequency with the direction of travel of the body, and the body is then maintained on a course toward the objective by correcting the direction of travel of the body in accordance with the frequency of the perceptible signal.

A simple form of apparatus embodying this invention may comprise means for radiating a system of oscillations of given frequency such as a radio carrier wave from a fixed station having a known location with respect to an objective to which it is desired to direct a body, and means for generating a second system of oscillations of a given frequency at a position spaced from the station. For example, we may provide a radio transmitting station radiating a carrier wave, and an electrical oscillator of given frequency at a position spaced from the radio station. We also provide means for superimposing the two systems of oscillations to produce a composite system of oscillations (in either of the ways described above) in radio-receiving means carried on the body, which radio-receiving means includes means for obtaining a perceptible signal from the composite system of oscillations, and which signal varies in frequency with the direction of travel of the body. In one embodiment of our invention, the radio-receiving means on the moving body may include the oscillator for generating the second system of oscillations, as well as means for superimposing the radiated system of oscillations and the locally generated second system of oscillations, so that a beat frequency or composite system of oscillations is produced therein.

In other cases the means for generating oscillations may comprise the oscillation generator of a second fixed transmitting station which radiates the generated oscillations so that the two sets of waves or oscillations are superimposed in space to produce the composite system of oscillations.

A perceptible signal may be defined for purposes of this disclosure as a signal which is interpretable either automatically or visually or aurally so that certain prescribed operations may be carried out in response thereto. For example, the tone in a headset or the reading of an instrument or the current in a control circuit controlled by the composite system of oscillations in the radio-receiving means, may be considered as a perceptible signal.

Our invention will be better understood from the following description in conjunction with the accompanying drawings, in which:

Fig. 7 is a diagrammatic representation of an apparatus arrangement which may be utilized to obtain course indications with the system illustrated in Figs. 5 and 6;

Fig. 8 is a diagrammatic representation of a modified apparatus arrangement for use with the system illustrated in Figs. 5 and 6;

Fig. 9 is a diagram of an indicator used with the apparatus of Fig. 8;

Figs. 10 and 11 show current relations obtained in the indicator of Fig. 9;

Figs. 12 and 13 diagrammatically illustrate arrangements for flying extended courses; and Fig. 14 is a front elevation of an airplane showing antennae mounted for the practice of our invention.

We have found it preferable to make certain rather idealized theoretical assumptions in order to present simply the following explanation of the operation of this invention. For this reason we do not wish to be bound to any particular theory of operation. It will also be appreciated that the advantages of this invention may be realized by utilizing the apparent frequency of oscillations radiated from a moving body as well as from a fixed station. Such oscillations may be received at a fixed or a moving location.

Figure 1:
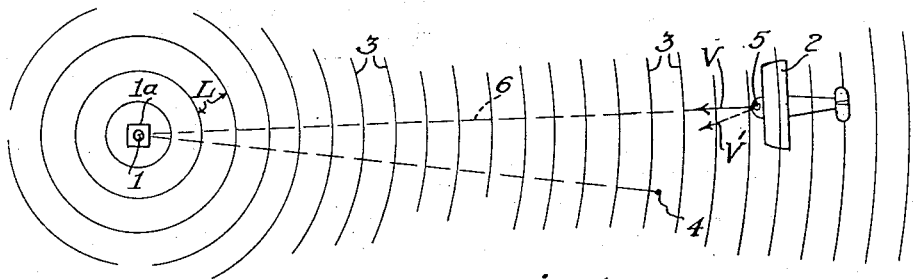
Fig. 1 is a diagrammatic plan view illustrating the method of our invention as applied to guiding an airplane toward a single land station.

Referring to Fig. 1, a radio transmitting antenna is indicated generally at 1 and may be located at or near the known objective or place of destination of an airplane 2. Radio waves generated at radio station 1a are radiated from antenna 1, which is preferably a vertical radiator, and the fronts of the successive waves are indicated by the circles 3 all having a common center at the antenna 1. The wave fronts 3 are traveling away from the antenna 1 at the velocity of light and are separated from one another by a distance L which is equal to the wave length of the radiated wave. At any fixed point in space, as for example at point 4, the apparent distance between the wave fronts 3 is equal to L and the frequency at which the waves pass an antenna located at 4 is equal to the frequency at which the waves are radiated from the antenna 1. The airplane 2 is provided with an antenna 5, which may be a non-directional vertical antenna, and the airplane may be considered as moving at a given velocity as indicated by the vector V toward antenna 1 along a radius 6 extending perpendicularly to wave fronts 3. It can now be seen that the moving antenna 5 intercepts waves more rapidly than a stationary antenna located at 4 and that the frequency of the waves passing the antenna 5 increases as the velocity of the plane increases along the radius 6 or along any other radial line toward the antenna 1. Thus by providing the airplane with means for measuring the apparent frequency of the wave broadcast from station 1, the velocity of the plane may be indicated under certain conditions.

It is also seen that the apparent frequency is a maximum for any given speed of the airplane when the component of the velocity toward the antenna 1 is a maximum. Thus, if the plane is directed off course as indicated by the dotted vector V', the component of the velocity toward the antenna 1 along the radial line 6 is less than V and the apparent frequency is decreased. This assumes that the air velocity of the plane is the same in both cases, which is ordinarily true since the plane is usually flown at a constant air speed. In any event, the apparent frequency is a maximum when the nose of the plane is directed toward the station 1, irrespective of the direction of the wind, as will be apparent to one skilled in the art and from the above description. The effect of a side wind is to make the plane travel a curved course, as is commonly traveled with many previously proposed radio homing systems. It is readily apparent, however, that the course of the plane is not dependent upon the strength of the signal intercepted by the antenna 5, but upon the apparent frequency at which waves are intercepted thereby.

Figure 2:
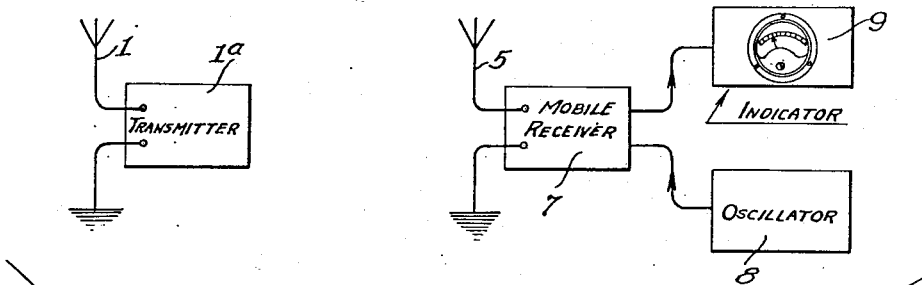
Fig. 2 is a diagrammatic representation of an apparatus arrangement which may be used for guiding an airplane when utilizing the system illustrated in Fig. 1.

Referring to Fig. 2, an apparatus for guiding an airplane in accordance with the method of Fig. 1 is illustrated diagrammatically. The airplane antenna 5 is shown connnected to a mobile receiver 7 carried in the airplane and in which the waves received from transmitter 1a as radiated from antenna 1 are mixed with or superimposed upon oscillations generated in an oscillator 8 carried on the plane. The resulting or composite oscillations are then fed to an indicator 9 which may be made to directly indicate either the apparent frequency of the received waves 3 or the actual increase in frequency thereof. The transmitter 1a and the oscillator 8 preferably have extremely high frequency-stability characteristics so that any change in the apparent frequency as indicated by the indicator 9 is caused primarily by a change in the velocity of the moving body and not by variations in frequency of the wave transmitted from the antenna 1 and the oscillations generated in the oscillator 8.

It is appreciated that the apparent change in frequency produced by an airplane traveling at 200 miles an hour toward radio waves traveling at the speed of light and having frequencies on the order of from 300 kilocycles to 10 megacycles, for example, or of greater or lesser frequency is relatively small. However, by beating the received wave with a wave of constant frequency, these relatively small changes in apparent frequency may be separated as beat frequencies. Thus, the indicator 9 may indicate beat frequencies on the order of from several cycles per second to one cycle in a relatively large number of seconds. It will be apparent to those skilled in the art that suitable frequency multipliers may be interposed between the receiver and the indicator, whereby the frequency of the perceptible signal may be greatly increased.

Theoretically, it is not necessary to generate oscillations in the oscillation generator or secondary frequency standard 8 to operate according to the method outlined in relation to Fig. 1, since there will be an apparent change in frequency of the received wave fronts 3. However, practical considerations make it desirable to beat the incoming signal, or some signal controlled thereby, with a fixed frequency to produce a composite or beat frequency from which a perceptible signal can be obtained. This is because no known frequency measuring equipment is now available which will directly indicate the change in frequency of the received wave without beating it with a fixed frequency standard.

Figure 3:
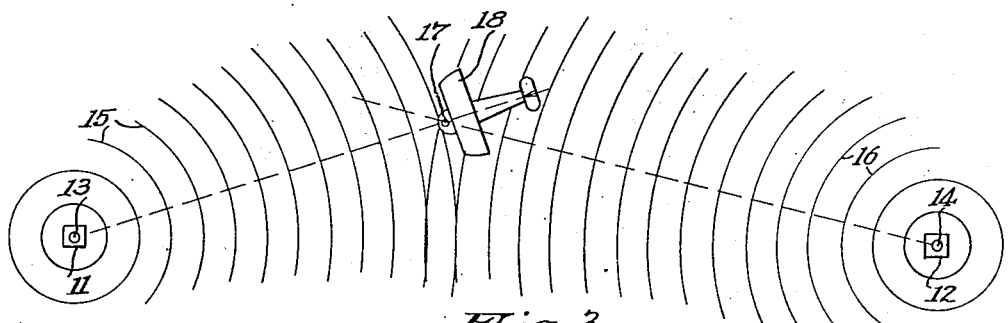
Fig. 3 is a diagrammatic plan view illustrating a variational method of our invention as applied to guiding an airplane in the area between a pair of fixed land stations.
Figure 4:
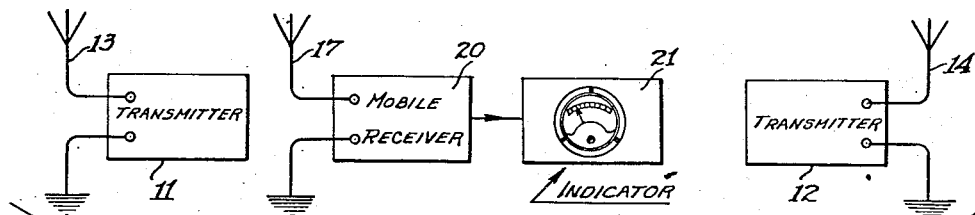
Fig. 4 is a diagrammatic representation of variational apparatus arrangement which may be utilized to obtain course indications with the system illustrated in Fig. 3.

A modified system utilizing the principles illustrated in Figs. 1 and 2 is illustrated in Figs. 3 and 4 and has an advantage over the system first described in that no secondary frequency standard is required on the airplane. Radio stations are shown at 11 and 12 and are provided with antennae such as vertical radiators 13 and 14 respectively. The wave fronts of the waves radiated from antennae 13 and 14 are indicated at 15 and 16 respectively. The frequencies of the waves radiated from the two antennae may be the same or different, but the frequency of each of the waves is preferably maintained constant to a high degree of precision and for this reason the waves 15 and 16 are preferably controlled by a common master frequency source. Thus station 11 may comprise a frequency standard which maintains the waves 15 at a constant frequency. A receiver located at the station 12 may be tuned to waves 15 and operate to control the frequency of wavs 16 in accordance with the frequency of waves 15.

Antennae 13 and 14 may be located a considerable distance from on another, as for example a hundred miles or more from one another or on a course between two places, or each may be located adjacent one of the places. When an airplane is flying from a place in the neighborhood of antenna 14 toward a place in the neighborhood of antenna 13, the antenna 17 carried on a plane 18 receives the waves 15 at an increase in apparent frequency and the waves 16 at a decrease in apparent frequency. In general, the changes in frequency as received are determined by the components of the velocity along lines radial of the sending stations and are greatest when the airplane has velocity components toward and away from 11 and 12; and the frequency difference is a maximum under like conditions, regardless of the location of the airplane relative to the stations. By flying to keep the difference in apparent frequency between the waves 15 and 16 at a maximum, the airplane flies a course that terminates at station 11, which the plane finally approaches on a radial path. A receiver 20 carried on the airplane and connected to antenna 17 indicates in indicator 21 the greatest apparent difference in frequency between the two waves 15 and 16 when the plane is directed on a course between and toward either of antennae 13 and 14, and the indication will tend to decrease when the plane deviates from that course. The receiver 20 may comprise a suitable radio frequency amplifier for receiving and amplifying the frequencies of the waves 15 and 16, and the indicator 21 may comprise suitable means for isolating and amplifying the difference in frequency between the waves 15 and 16 as amplified and for rendering the difference between frequencies perceptible.

Strictly speaking, the course which will give the greatest maximum frequency difference lies along the straight line 13—14 passing through both the radiators. This course is obtained only when there is a head wind, a tail wind, or no wind. All other courses because of side wind are curved, but these courses, for a given side wind, deviate from a straight line course considerably less than the courses flown when using previously proposed radio homing systems. The reason for this is better illustrated in Fig. 5, and will be described subsequently in relation to said figure. It will suffice now to say that the airplane 18 is on course, for any given position thereof between stations 11 and 12, when the difference is greatest between its velocity toward 13 and its velocity from 14.

In the example above described, the antenna 13 radiates a system of oscillations and a second system of oscillations is generated in transmitter 12, which is spaced from radiator 13, and the two systems of oscillations are superimposed in space, since the oscillations generated by transmitter 12 are radiated by antenna 14. The superimposed or composite oscillations or waves are received by receiver 20.

Figure 5:
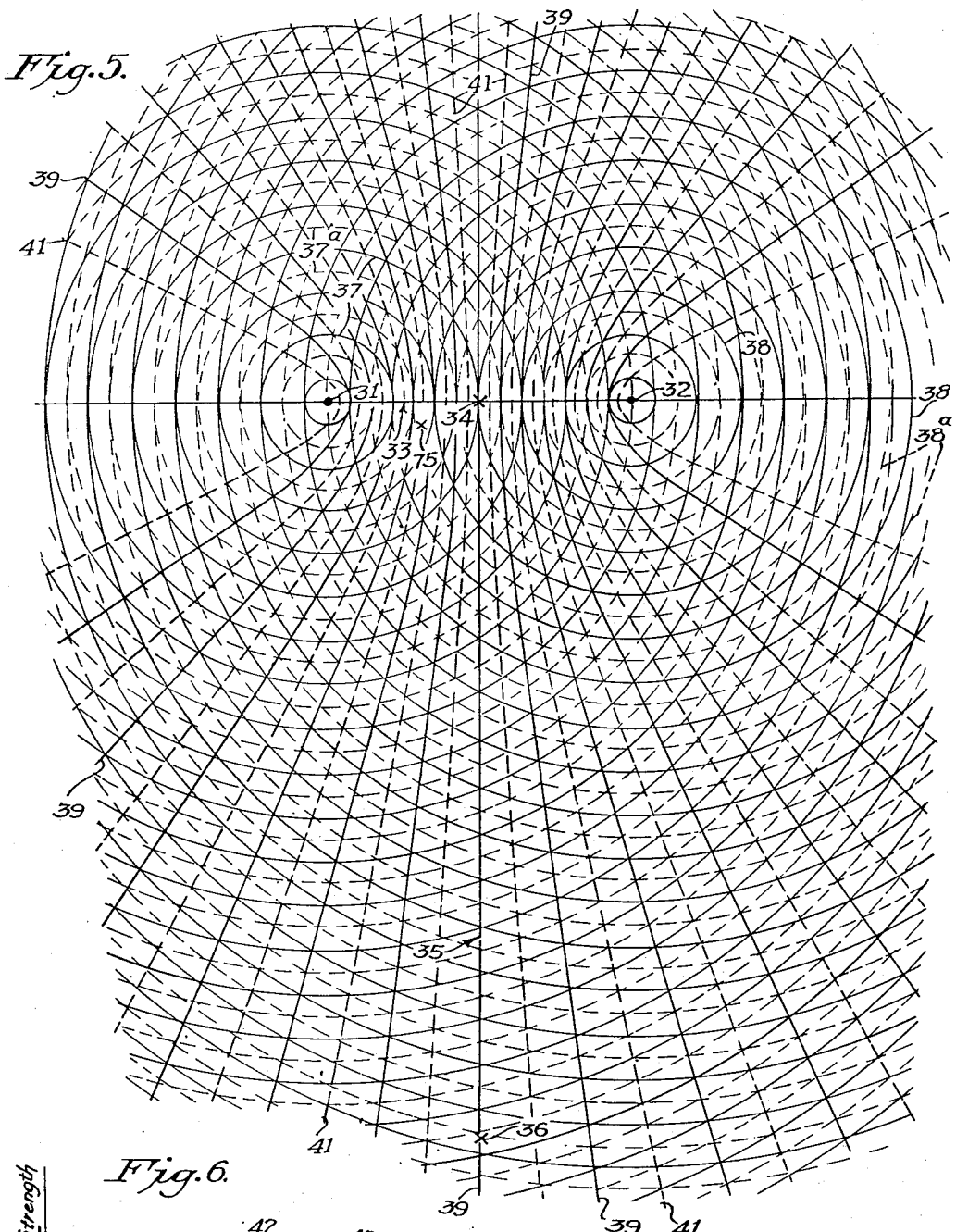
Fig. 5 is a diagrammatic plan view of a wave pattern which is assumed to exist when a pair of spaced radiators are excited in phase and at the same frequency.

For this disclosure, it may be assumed that when a pair of radiators are excited at exactly the same frequency, as for example from the same transmitter, and radiate with a constant phase displacement, a definite space pattern of radio waves is produced, and this pattern may be used to provide definite paths for the guidance of airplanes or other objects. Referring now to Fig. 5, spaced antennae are shown at 31 and 32 in fixed locations. Antennae 31 and 32 are preferably vertical radiators so as to radiate vertically polarized waves. In practice, antennae 31 and 32 are spaced a considerable number of wavelengths apart, that is, on the order of from one to a hundred miles, more or less, and the straight line 33 passing through antennae 31 and 32 is preferably at right angles to the most highly traveled course which an airplane is desired to maintain. We may assume that the destination of an airplane is in the neighborhood of a point 34 and that the most direct and best traveled course to the point 34 is along a straight line 35 from a distant point of departure 36. For convenience of illustration antennae 31 and 32 have been placed seven wavelengths apart, while in practice they are usually located a greater number of wavelengths apart.

The wave fronts emanating from antenna 31 are indicated by circles 37 and 37a and the wave fronts emanating from antenna 32 are indicated by circles 38 and 38a, assuming radiators 31 and 32 to be excited by a suitable radio frequency source.

The waves 37 and 38 are shown emanating from the respective radiators 31 and 32 in phase; but this is not necessary and other constant phase relations may be maintained; and as long as a constant phase relation is maintained, the pattern will be the same as shown, but will be shifted in space toward one station or the other a maximum of one-half a wave-length, depending on the phase difference. To simplify the consideration, the full-line circles 37 and 38 represent positive peaks of the wave fronts and the dotted circles 37a and 38a represent the negative peaks of the wave fronts. By inspection, it will be seen that at their points of intersection wave fronts 37 and 38 are in phase and likewise wave fronts 37a and 38a are in phase, and amplify or reinforce one another in a positive or negative direction. Lines drawn through these points of intersection are lines of maximum signal strength, and are indicated by the curved solid lines 39. Midway between each of the successive solid lines 39, similar lines may be drawn which pass through points at which the wave fronts are out of phase and tend to cancel one another. These latter lines are designated as lines of zero or minimum signal strength and are represented by dotted lines 41. With the arrangement shown, the centrally disposed straight line 35 is also one of the lines of maximum signal strength. Another straight line of maximum signal strength is the line passing through the stations 31 and 32, except in the portion thereof between the stations 31 and 32.

The maximum signal strength lines 39 and 35 and the minimum signal strength lines 41 may be considered as existing in space and are spaced from one another by a distance equal to a quarter wave-length where they cross the line 31—32 and tend to diverge at positions removed from the line 31—32. The positions of the lines 39 and 41 will remain stationary in space as long as the frequency of the waves generated by stations 31 and 32 are exactly equal and as long as the phase relation between the waves generated by the respective stations remains constant. A pattern which is stationary for all practical purposes may be obtained with present-day equipment. Thus it may be said that the waves radiated from the respective radiators tend alternately to reinforce and to cancel one another in contiguous zones extending in side by side relation and passing between the radiators. These zones define courses and an airplane or other moving body may be guided therealong, as will be described subsequently.

An airplane located at point 36 may be flown along line 35 to the point 34 by maintaining an antenna in the airplane positioned along a line 35 where the signal strength is greatest. As another example, the apparatus arrangement of Fig. 3 may be used and the airplane flown to maintain indicator 21 at zero. This is accomplished when the plane is directed along any one of the courses following one of lines 39, 35, or 41, the components of the plane's velocity toward each of the stations 31 and 32 being equal when the plane is flown along paths defined by any of these lines. Thus the apparent frequency of waves 37 and 38 is equal and there is no beat frequency. On-course flight is indicated by zero beat.

Figure 6:
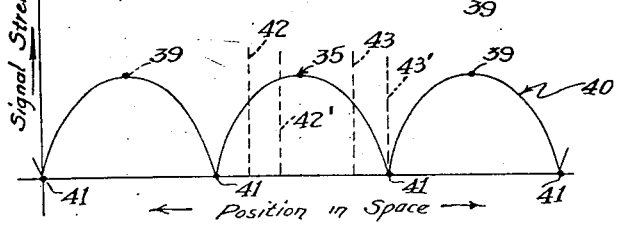
Fig. 6 is a signal strength curve which is obtained with the arrangement of Fig. 5.

In Fig. 6 we have illustrated graphically by curve 40 the signal strength along any line in space which is transverse to the lines 39 and 41. The signal strength is shown as zero at 41 which is ideally true but not necessarily attained in practice.

We prefer to utilize an arrangement which indicates the direction of the plane's deviation from a flight path and gives what are commonly known as right and left indications. An airplane is provided with spaced antennae preferably adjacent the wing tips, and the positions of the two antennae are designated by the dotted lines 42 and 43 in Fig. 6 and shown at 42 and 43 on plane 100 in Fig. 14. The said antennae may be located in any other suitable positions laterally spaced on the airplane with respect to the direction of travel. These antennae may be non-directional and may comprise vertical rods or other suitable antennae. In this position the strength of the signals received by the respective antennae is equal when the plane is on course. Assume now that the plane is off the course and that the antennae occupy positions 42' and 43'. The signal strength at position 42' is much greater than at position 43', so that a radio receiver connected to an antennae positioned at 42' gives a much stronger signal than a radio receiver connected to an antennae positioned at 43'. Furthermore, it can be seen that as the plane moves off the course in one direction, the signal received by one antenna increases in strength and that when the plane moves off the course in the other direction, the strength of the signal received by the other antenna increases in strength. Thus, with proper apparatus, the sense of the off-course position to the right or left of the true course may be obtained.

We may consider the pattern shown in Figs. 5 and 6 as comprising a plurality of courses, each following one of the lines 39 or 41, centrally of the course, and each course extending laterally to boundaries defined by successive maxima or minima lines. The courses are in substantially contiguous side by side relation and pass between the radiators 31 and 32. The lateral extent of each course has a calculable or determinable value at any given distance from the radiators 31 and 32 and each course has a given compass direction at a given position.

Referring now to Fig. 7, antennae 42 and 43 are shown connected to amplifiers 46 and 47 respectively. The antenna 42 may be located adjacent one wing tip of an airplane and the antenna 43 may be located adjacent the other wing tip. A low frequency oscillator 48 which may oscillate at any convenient frequency, for example at 100 cycles per second, is connected to amplifiers 46 and 47 to alternately bias the same to cut-off so that when amplifier 46 is sending a received signal to intermediate radio frequency amplifier 49, amplifier 47 is inoperative, and vice versa. The amplified signal from intermediate amplifier 49 is fed to separate detectors 51 and 52 which are controlled by the low frequency oscillator 48 in the same manner as the amplifiers 46 and 47 and in synchronism therewith, so that detector 51 operates on the signal coming from amplifier 46 and detector 52 operates on the signal coming from amplifier 47. Thus, detectors 51 and 52 operate alternately and successively and the output thereof may be fed in opposition to an indicator 53 which may comprise a zero-center milliammeter. The apparatus may be so adjusted that when the signal strengths at antennae 42 and 43 are equal, the outputs of detectors 51 and 52 are equal and the indicator reads zero or on course. Left or right indications occur when the signal strength at one of the antennae is greater than at the other. It will be appreciated that the apparatus may be adjusted to give an on-course indication when the signal strengths at the respective antennae are other than equal, in which case the right and left indications will result from the change in signal strength from the on-course value.

In order to provide for an indication of the magnitude of the deviation from a flight course, amplifier 49 is provided with automatic volume control, suitable delay being provided at 54 to prevent operation of the automatic volume control on the separate signals received from the amplifiers 46 and 47 and to allow the operation of the automatic volume control on the combination of the two signals supplied from amplifiers 46 and 47. A tuning indicator is shown at 50 and may be used to indicate the passage of the antennae in lateral direction across the lines 39 and 41, the function thereof, among other functions, being to give a beat indication.

Referring to Fig. 8, we have illustrated a somewhat simplified receiver of the type illustrated in Fig. 7. Antennae 42 and 43 are connected respectively to amplifiers 63 and 64 which are controlled by low frequency oscillator 65 and are fed to an intermediate radio frequency amplifier 66. A tuning indicator is shown at 66a. This portion of the apparatus may correspond in general to the same portion of the apparatus illustrated in Fig. 7. The output of amplifier 66 is fed to a single detector 67 which is connected to an indicator 68. In Fig. 9 the indicator 68 is shown as comprising an electrodynamometer having a field coil 69 connected to the low frequency oscillator 65 and a moving coil 70 connected to the detector 67. With this arrangement, for reasons brought out subsequently, pointer 71 of meter 68 will remain at zero when the signal strength at antennae 42 and 43 is equal and will deviate to the right or left as the signal strength in the two antennae becomes unequal.

The output of detector 67 for an off-course position is illustrated graphically in Fig. 10, the areas 73 representing the signal supplied by amplifier 63 and the areas 74 representing the signal supplied by amplifier 64. Fig. 10 thus represents the current supplied by the detector 67 to the moving coil 70 of the instrument 68. The field coil 69 is supplied directly from low frequency oscillator 65, and Fig. 11 shows graphically the current in the coil 69. To simplify the consideration of the operation of the meter 68, Fig. 11 has been placed directly below Fig. 10, so that the phase relation of the currents in the coils 69 and 70 will be readily apparent. The areas 73a represent the positive half-cycles and the areas 74a represent the negative half-cycles of the wave supplied by the oscillator 65. The indication of the meter 68 results from the product of the areas 73 and 73a and the areas 74 and 74a. If the areas 73 and 74 are equal, the pointer 71 remains at zero. If the areas 73 and 74 are of different magnitudes, it is apparent that the pointer 71 will move either to the right or to the left, since the above-mentioned products will differ in magnitude and direction.

It will be appreciated that the perceptible signals received by the indicators 53 and 68 may be used to operate suitable relays to steer the airplane, as will be apparent to those skilled in the art.

Referring again to Figs. 5 and 6, it will be noted that the distance between lines 39 and 41 depends upon the wavelength of the wave radiated from antennae 31 and 32 and upon the distance from the stations, and this distance is equal to a quarter wavelength at line 31—32. Thus, by proper choice of wavelengths and by proper spacing of the antennae on an airplane, the distance between successive maximum lines 39 may be made much greater than the distance between the antennae on the airplane, so that the airplane may be readily maintained on a course between a pair of maxima. It is appreciated that if an airplane is flying with its antennae located on opposite sides of a maximum line 39, the right or left off-course indication will be opposite to that obtained when the airplane is flying with its antennae on opposite sides of a zero signal line 41. This does not represent a disadvantage, however, since if experience indicates that the direction of off-course shown on the indicator is wrong, the readings of the indicator may be corrected as, for example, by reversing the connections to either one of the coils 69 or 70, or the pilot may guide the plane to an adjacent course where the right and left indications are correct. As the plane passes from a maxima to minima course, there will be a reversal of the indicator 68 or 53.

Since the course flown with the arrangement illustrated in Figs. 5 through 11 is entirely independent of the velocity and direction of the wind, the land speed of the airplane may be indicated by measuring the apparent frequency of oscillations received by an antenna located on the airplane when the airplane is traveling on course. When flying along line 35, the increase in frequency of a wave propagated from point 34 is a measure of the true land velocity of the plane along line 35. However, if the apparent frequency of the composite space pattern produced by waves radiated from 31 and 32 is used to measure the land speed of the plane, the speed indicated will be only approximately true even if the plane is flying along straight line 35. The spacing between successive fronts of the waves produced by superimposition of the radiations propagated at 31 and 32 appears to decrease with an increase in distance from 31 and 32 as may be determined by inspection of Fig. 5, so that for any given land speed along a course the apparent frequency of the composite radiations as measured on the moving plane decreases as the plane approaches 31 and 32. The apparatus of Fig. 2 may be used to measure the apparent frequency to obtain speed indications or other frequency responsive means may be used, as will be apparent to those skilled in the art. It should also be noted that since the pattern illustrated in Figs. 5 and 6 may be considered stationary in space, the approximate distance of an airplane from a position intermediate the antennae 31 and 32 can be determined from the distance between successive maxima or minima lines. For example, the distance between the lines may be measured by flying at right angles to the course at a given speed and determining the distance from the time required to cross any two successive lines. Since the relative amplitude of the signals received by the two antennae will be equal when the plane is directed at right angles to a course, the right-left indicator will indicate on-course continuously, and other means such as the tuning indicator may be used to indicate the location of maxima and minima lines.

The distance between lines 39 and/or 41 may be measured without flying at right angles to the lines, as by flying a zig-zag path. For example, the plane may be flying centrally of and along a given course. At some position the plane may be deviated a given number of degrees to the right from the course and flown until the right-left indicator gives a desired right indication. The plane is then deviated to the left an equal number of degrees from the central course, and the time required for the plane to fly along this path from the above-mentioned right position to a left position of the same desired value is noted. The width of a given course may be determined from the data so obtained. This procedure may be repeated at a later interval to obtain a comparison in the width of the course and the approximate new position and distance traveled. A particular course may be maintained while determining the location of the plane, since it is not necessary to change from one course to another for this purpose.

By referring to Fig. 5 it can be seen that the distance between successive minima lines 41 increases with the distance along any one course from the radiators 31 and 32. Also, as would be expected, the signal strength along any maximum line 39 decreases with distance from the radiators, except within a certain area closely adjacent the radiators. Thus the shape of curve 40 in Fig. 6 bears a definite relation to the distance along any one zone or course from the radiators. The shape of the curve 40, and as a consequence the position on a given course, may be determined by comparing the signal strengths at the antennae 42 and 43, when flying a course with a minimum line or preferably a maximum line between the antennae 42 and 43, with the signal strength at an antenna 44 (see Fig. 14) located between antennae 42 and 43. This may be accomplished with well known means.

It is appreciated that the lateral separation of the wing tip antennae with respect to a given course will decrease as the angular heading of the plane with respect to the course increases. For most wind velocities and directions the error in course location produced by the angular heading will be negligible; however, by determining the angular heading of the plane with respect to the course, as will be described subsequently, the effect of such angularity may be determined and the correct position obtained.

The true compass heading of the plane along a course may be obtained by turning the plane to a position such that a line through both antennae 42 and 43 lies parallel to the course; and in this position zero indication is obtained on the right-left indicator and a maximum beat is shown on a tuning indicator independently of the direction of flight. The true compass bearing of the original course is then 90° from the compass bearing obtained in the new direction of flight with zero indication on the right-left indicator and a maximum beat.

All courses are very nearly straight lines at positions removed from stations 31 and 32 by distances greater than twice the spacing between the stations. Consequently, at all greater distances from the stations 31 and 32, the compass bearing of the course obtained as just described identifies the course.

The space pattern illustrated in Fig. 5 may be considered comparable to that obtained with the arrangement shown in Fig. 3 when the antennae 13 and 14 are excited at the same frequency. An airplane located at the point 75 in Fig. 5, for example, may be flown toward either one of the antennae 31 or 32 by using the apparatus illustrated in Fig. 4. The course of maximum beat will be a curved one, and is substantially perpendicular to the lines 39 and 41. A similar curved path will be obtained with the arrangement shown in Fig. 3 when the antennae 13 and 14 are excited at different frequencies, since the lines of maxima and minima will have the same general shape but will be shifting.

With each of the above described systems indications may be obtained which signify when the plane is approaching and passing the guiding station or stations. With the arrangement illustrated in Figs. 1 and 2, the indicator will show a minimum beat and a minimum speed indication in the area directly adjacent the antenna 1, which area may be likened to a cone of silence. By noting these phenomena the pilot will know that the plane has reached the radiator 1.

With the arrangement illustrated in Figs. 3 and 4, the plane passing either one of the radiators 13 or 14 will bring the plane into a zone of substantially zero beat and a minimum speed indication. With the arrangement illustrated in Figs. 5 and 6 there is a narrowing of the flight path upon approaching line 31—32 and a widening of the flight path after the plane passes line 31—32. This widening may be determined after the manner of determining the position of the plane on any given flight path as described above. Also, if speed indications are being obtained as above described, the speed of the plane will appear to be zero as the plane crosses the line 31—32, and the approach of the speed indication to zero indicates the approach of the plane to the line.

In the foregoing description the airplane's course was considered as from a position in space to a position adjacent a single station or to a position between a single pair of stations. In practice, it may be desirable to fly an airplane over a course of great length, in which case it may not be desirable to supply the airplane with radiated energy from a single fixed station or from a single pair of stations, although it is within the broad contemplation of this invention to guide airplanes over long flights to a single station or pair of stations, as from the coast of California to the Hawaiian Islands. Referring to Fig. 12, a course is indicated by the dotted line 76, and antennae are located at 77, 78, and 79 at spaced positions along the course 76. Each of the antennae may be radiating at a different frequency. An airplane at 80 may fly along the course 76 by utilizing the radiations from antenna 77. As soon as the plane enters the cone of minimum beat adjacent station 77 or passes station 77 as indicated by the minimum beat of the flight indicator or by the change in direction of a maximum beat course, the receiver may be tuned to radiations from antenna 78. After the plane has passed antenna 78 the receiver may be tuned to radiations from antenna 79. When flying with the arrangement shown in Fig. 12, radiations from pairs of successive stations as well as individual stations may be utilized. It is apparent that the course 76 may be extended for any desired distance and in various directions, and as many different radiators may be provided as needed.

In Fig. 13 a desired course 91 is shown directed between antennae of a plurality of pairs of antennae 93, 94, and 95, each pair of which may be radiating at a different frequency, the antennae of each pair radiating at the same frequency to produce fixed space patterns in the manner of antennae 31 and 32 of Fig. 5. A plane flying from point 92 on course 91 may follow the course 91 by tuning to receive oscillations from the successive pairs of stations 93, 94, and 95 as they are approached, the approach thereof being indicated as described above.

It will be appreciated that the courses illustrated by the lines 76 and 91 in Figs. 12 and 13 are not necessarily straight and that curved or angular courses may be laid out in accordance with the teaching of these figures.

Although we have denoted a preference for vertical radiators and vertical receiving antennae, it will be appreciated that horizontal radiators and antennae may be employed as well as other types if desired. Also, this invention is not limited to the use of unmodulated carriers, but modulated carriers may be used and the modulation frequency or frequencies used as a means of determining course and/or speed as described above in relation to radiated carrier waves.

In all of the arrangements above described we prefer to place the antennae on the airplane so that they are as insensitive as possible to all waves except vertically polarized waves. For this reason we prefer to shield the antennae as much as possible by the material in the airplane so that reflected and refracted waves from the Kennelly-Heaviside layer will not interfere with the proper operation of the equipment. Thus, we find it advantageous to maintain the antennae at positions beneath the wings or fuselage of the airplane.

It will be appreciated that numerous modifications within the broad contemplation of the invention herein disclosed and claimed will become apparent to those skilled in the art; hence, we do not wish to be limited to the specific examples shown and described, but rather to the scope of the appended claim.

The use of the word "predetermined" throughout the specification and claim as applied to the frequency of the perceptible signal is meant to include a maximum value or a minimum value and is not limited to a given numerical value.

We claim:

The method of guiding a moving body on a course toward a known objective, which includes the steps of radiating radio carrier waves of the same frequency and with a constant phase displacement from two fixed vertical radiators spaced from one another by a distance on the order of several carrier wavelengths so that the waves radiated from the respective radiators tend alternately to reinforce and cancel one another in contiguous zones extending in side by side relation and passing between said radiators; receiving said waves on spaced antennae carried on said body at a distance from said radiators which is large compared to the distance between said radiators; comparing the amplitudes of the carriers received by each of said antennae; and maintaining said body in movement in a direction defined by one of said zones by guiding said body so as to maintain a given relation between the amplitudes of the carriers received by said antennae.

WILLIAM H. DONNELLY.
PAUL J. HOLMES.

CERTIFICATE OF CORRECTION.

Patent No. 2,218,907. October 22, 1940.

WILLIAM H. DONNELLY, ET AL.

It is hereby certified that error appears in the printed specification of the above numbered patent requiring correction as follows: Page 3, second column, line 35, for "wavs" read --waves--; line 38, for "on" read --one--; line 39, for "or" second occurrence, read --and--; page 5, first column, lines 6 and 8, for "antennae" read --antenna--; and that the said Letters Patent should be read with this correction therein that the same may conform to the record of the case in the Patent Office.

Signed and sealed this 17th day of December, A. D. 1940.

(Seal)

Henry Van Arsdale,
Acting Commissioner of Patents.

CERTIFICATE OF CORRECTION.

Patent No. 2,218,907. October 22, 1940.

WILLIAM H. DONNELLY, ET AL.

It is hereby certified that error appears in the printed specification of the above numbered patent requiring correction as follows: Page 3, second column, line 35, for "wavs" read --waves--; line 38, for "on" read --one--; line 39, for "or" second occurrence, read --and--; page 5, first column, lines 6 and 8, for "antennae" read --antenna--; and that the said Letters Patent should be read with this correction therein that the same may conform to the record of the case in the Patent Office.

Signed and sealed this 17th day of December, A. D. 1940.

(Seal)

Henry Van Arsdale,
Acting Commissioner of Patents.